(12) United States Patent
Lee

(10) Patent No.: US 12,423,933 B2
(45) Date of Patent: Sep. 23, 2025

(54) AUGMENTED REALITY CONTENT IN-SITU AUTHORING METHOD AND APPARATUS

(71) Applicant: INDUSTRY ACADEMY COOPERATION FOUNDATION OF SEJONG UNIVERSITY, Seoul (KR)

(72) Inventor: Jong Weon Lee, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 317 days.

(21) Appl. No.: 18/162,533

(22) Filed: Jan. 31, 2023

(65) Prior Publication Data

US 2024/0212299 A1    Jun. 27, 2024

(30) Foreign Application Priority Data

Dec. 26, 2022    (KR) .................. 10-2022-0184756

(51) Int. Cl.
    *G06T 19/20*    (2011.01)
    *G06T 7/73*     (2017.01)
    *G06T 17/10*    (2006.01)
    *G06T 19/00*    (2011.01)

(52) U.S. Cl.
    CPC ............... *G06T 19/20* (2013.01); *G06T 7/74* (2017.01); *G06T 17/10* (2013.01); *G06T 19/006* (2013.01); *G06T 2207/20021* (2013.01); *G06T 2207/30196* (2013.01); *G06T 2219/2004* (2013.01); *G06T 2219/2016* (2013.01)

(58) Field of Classification Search
    CPC   G06T 19/20; G06T 7/74; G06T 17/10; G06T 19/006; G06T 2207/20021; G06T 2207/30196; G06T 2219/2004; G06T 2219/2016
    See application file for complete search history.

(56) References Cited

U.S. PATENT DOCUMENTS

| | | | |
|---|---|---|---|
| 2003/0208296 A1* | 11/2003 | Brisson | A61B 90/10 700/117 |
| 2015/0356788 A1* | 12/2015 | Abe | A63F 13/335 345/633 |
| 2019/0026948 A1* | 1/2019 | Kellogg | G06T 19/006 |
| 2022/0092852 A1* | 3/2022 | Mohan | G06T 7/74 |

FOREIGN PATENT DOCUMENTS

| | | |
|---|---|---|
| KR | 10-1470757 B1 | 12/2014 |
| KR | 10-1743569 B1 | 6/2017 |

\* cited by examiner

*Primary Examiner* — Daniel F Hajnik
*Assistant Examiner* — Adeel Bashir

(57) ABSTRACT

Disclosed is an augmented reality content in-situ authoring method and apparatus. In an augmented reality content in-situ authoring method, a reference object or an augmented target object to be augmented may be selected from a camera preview image of a real world, a two-dimensional (2D) plane region may be recognized based on the selected reference object or the augmented target object and then a virtual 3D space may be constructed and divided based on the 2D plane region, and augmented reality content may be augmented through the divided space.

8 Claims, 5 Drawing Sheets

AUGMENTED REALITY CONTENT IN-SITU AUTHORING METHOD AND APPARATUS

CROSS-REFERENCE TO RELATED APPLICATION

This application claims priority under 35 U.S.C. § 119(a) to Korean Patent Application No. 10-2022-0184756 filed on Dec. 26, 2022, in the Korean Intellectual Property Office, the disclosure of which is incorporated herein by reference in its entirety.

BACKGROUND

(a) Technical Field

The present disclosure relates to an augmented reality content in-situ authoring method and apparatus.

(b) Background Art

Recently, due to the rapid increase in the usage of mobile devices according to vitalization of mobile markets, many smart phone applications related thereto are being created. In particular, augmented reality (AR) service using a mobile device is a technology that shows augmented content (virtual object) in the real world (real space), and mixed reality, which combines augmented content with additional information in real time in the real world and shows the content as a single image, has been under various research and development since the late 1990s.

However, most of the conventional authoring systems are dominated by existing general interaction methods in a PC environment. Related research is being conducted on an application that scans a 3D real space using some smart devices and writes based on a plane existing in the real space, but there are difficulties and low efficiency in augmenting virtual content in various positions in real space.

SUMMARY

The present disclosure is to provide an augmented reality content in-situ authoring method and apparatus.

The present disclosure is to provide an augmented reality content in-situ authoring method and apparatus capable of finely adjusting an augmented object position through repetitive division of a three-dimensional (3D) space in a field where augmented reality content is actually used.

According to an aspect of the present disclosure, there is provided an augmented reality content in-situ authoring method.

According to an embodiment of the present disclosure, an augmented reality content in-situ authoring method may include: (a) selecting a reference object or an augmented target object to be augmented from a camera preview image of a real world; (b) recognizing a two-dimensional (2D) plane region based on the selected reference object or the augmented target object and then constructing a virtual three-dimensional (3D) space centered on the 2D plane region, the virtual 3D space including a plurality of 3D cube areas surrounding the recognized 2D plane region; (c) reconstructing a virtual sub-space including a plurality of sub-cube areas by dividing at least one of the plurality of 3D cube areas at least once; and (d) selecting any one of the plurality of sub-cube areas as an augmented target space, augmenting the augmented target object centered on the augmented target space and then rotating the augmented target object to determine an augmented direction, and then registering the augmented reality content in a database, in which a size of the virtual 3D space may be constructed differently according to at least one of a type and size of the augmented target object or the reference object.

The augmented reality content may further include augment-related meta information, and the augment-related meta information includes an augmented position corresponding to an augmented target space and the augmented direction.

The augmented reality content in-situ authoring method may further include, prior to (b), receiving a selection of an authoring position in a camera preview image through author's gaze tracking and a point using a part of an author's body in the camera preview image, in which at least one of the size of the virtual 3D space and the central position may be constructed differently according to the selected authoring position.

In (c), the division process may be repetitively performed until the size of the augmented target space reaches a target size.

The plurality of 3D cube areas constituting the virtual 3D space may be expressed as different visual information, but may be expressed as different visual information in consideration of an author's constraint.

The augmented reality content in-situ authoring method may further include, prior to (c), when another cube area adjacent to the selected 3D cube area is additionally selected, reconstructing a sub-virtual space by integrating the selected 3D cube area and the additionally selected cube area.

The augmented reality content in-situ authoring method may further include, prior to (d), adjusting the size or position of the selected 3D cube area according to a size or position adjustment trigger command.

According to another aspect of the present disclosure, there is provided an augmented reality content in-situ authoring apparatus.

According to an embodiment of the present disclosure, an augmented reality content in-situ authoring apparatus may include: a camera: a memory including at least one instruction; and a processor executing instructions stored in the memory, wherein each of the instructions executed by the processor performs: (a) selecting a reference object or an augmentation target object to be augmented from a camera preview image of a real world; (b) recognizing a two-dimensional (2D) plane region based on the selected reference object or the augmented target object and then constructing a virtual three-dimensional (3D) space centered on the 2D plane region, the virtual 3D space including a plurality of 3D cube areas surrounding the recognized 2D plane region; (c) reconstructing a virtual sub-space including a plurality of sub-cube areas by dividing at least one of the plurality of 3D cube areas at least once; and (d) selecting any one of the plurality of sub-cube areas as an augmented target space, augmenting the augmented target object centered on the augmented target space and then rotating the augmented target object to determine an augmented direction, and then registering the augmented reality content in a database, and a size of the virtual 3D space is constructed differently according to at least one of a type and size of the augmented target object or the reference object.

Each of the instructions may further perform, prior to (b), receiving a selection of an authoring position in a camera preview image through author's gaze tracking and a point using a part of an author's body in the camera preview image, and at least one of the size of the virtual 3D space and the central position may be constructed differently according to the selected authoring position.

In (c), the division process may be repetitively performed until the size of the augmented target space reaches a target size.

DETAILED DESCRIPTION

In the present specification, singular forms include plural forms unless the context clearly indicates otherwise. In the specification, it is to be noted that the terms "comprising" or "including," and the like, are not be construed as necessarily including several components or several steps described in the specification and some of the above components or steps may not be included or additional components or steps are construed as being further included. In addition, terms " . . . er/or," "module," and the like, described in the specification refer to a processing unit of at least one function or operation and may be implemented by hardware or software or a combination of hardware and software.

Hereinafter, embodiments of the present disclosure will be described in detail with reference to the accompanying drawings.

Figure 1:
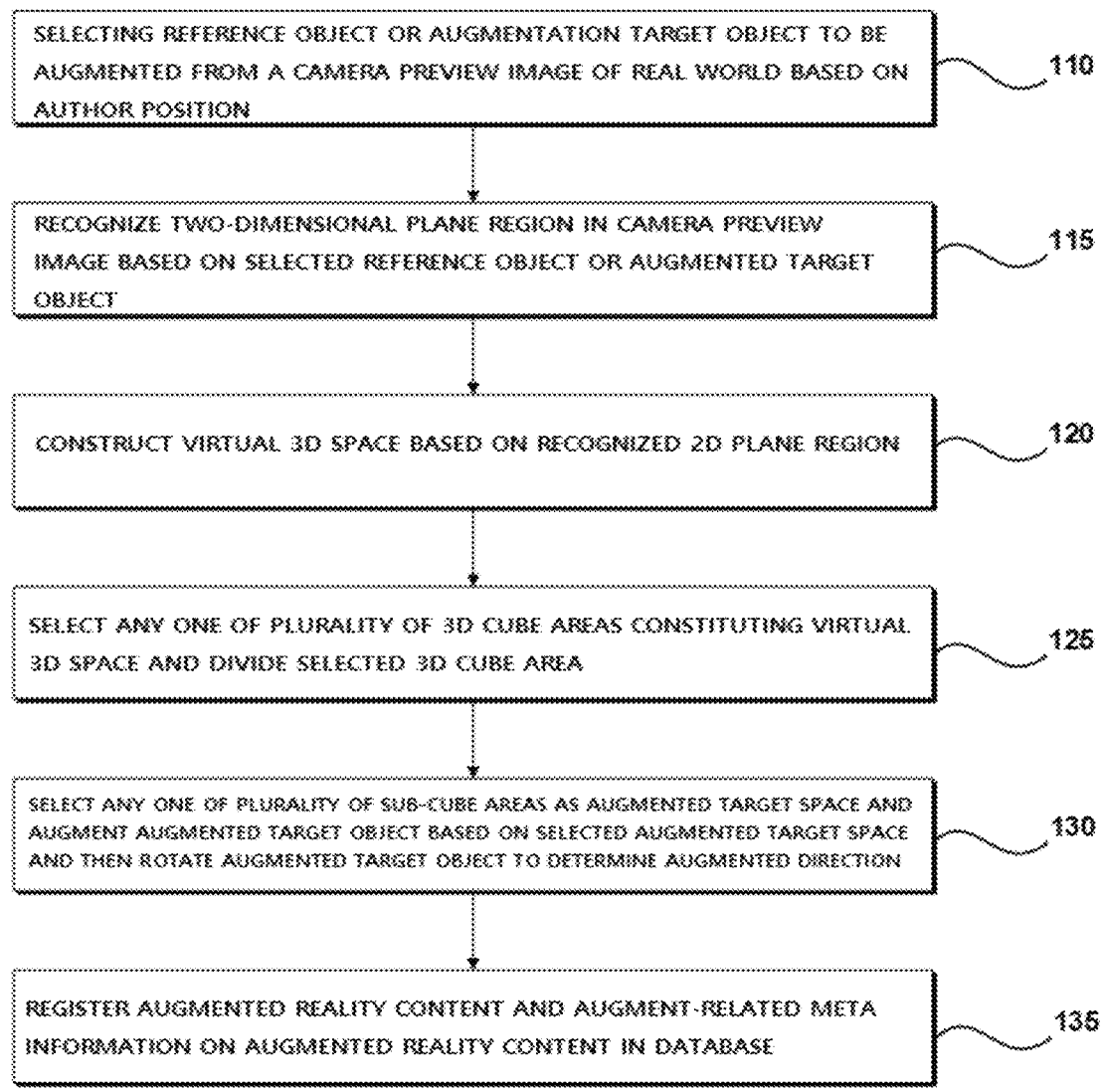
FIG. 1 is a flowchart illustrating an augmented reality content in-situ authoring method according to an embodiment of the present disclosure.
Figure 2:
FIG. 2 is a diagram illustrating division of a virtual three-dimensional space according to an embodiment of the present disclosure.
Figure 3:
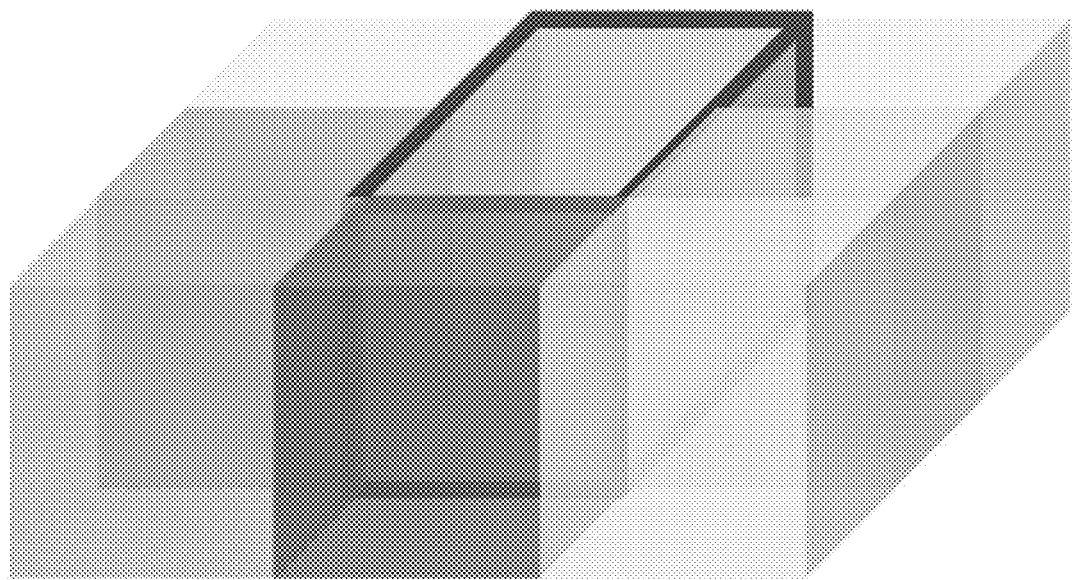
FIG. 3 is a diagram illustrating an example in which some virtual spaces are integrated according to an embodiment of the present disclosure.
Figure 4:
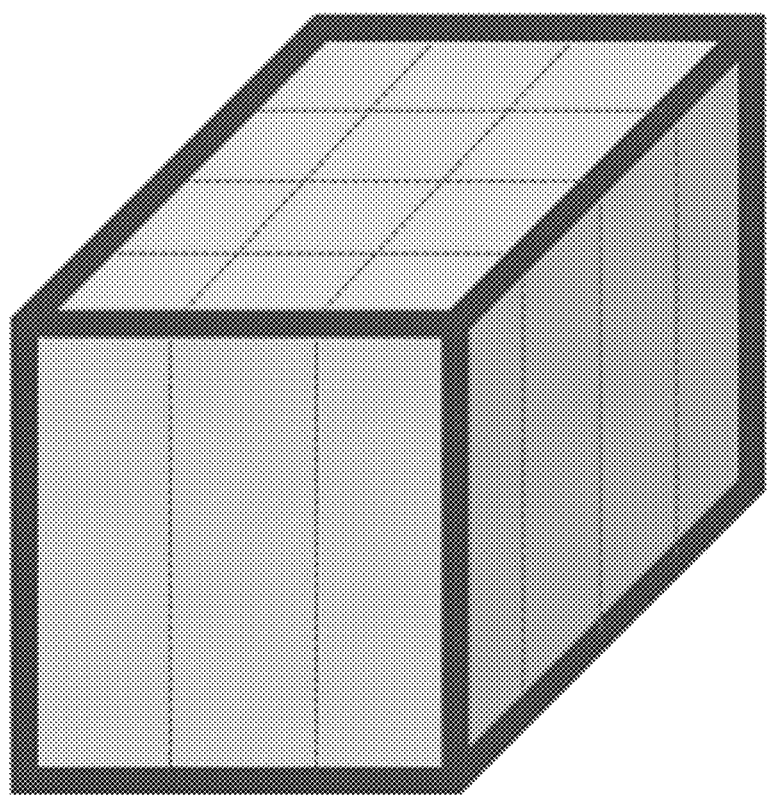
FIG. 4 is a diagram illustrating division of the integrated virtual space according to an embodiment of the present disclosure.
Figure 5:
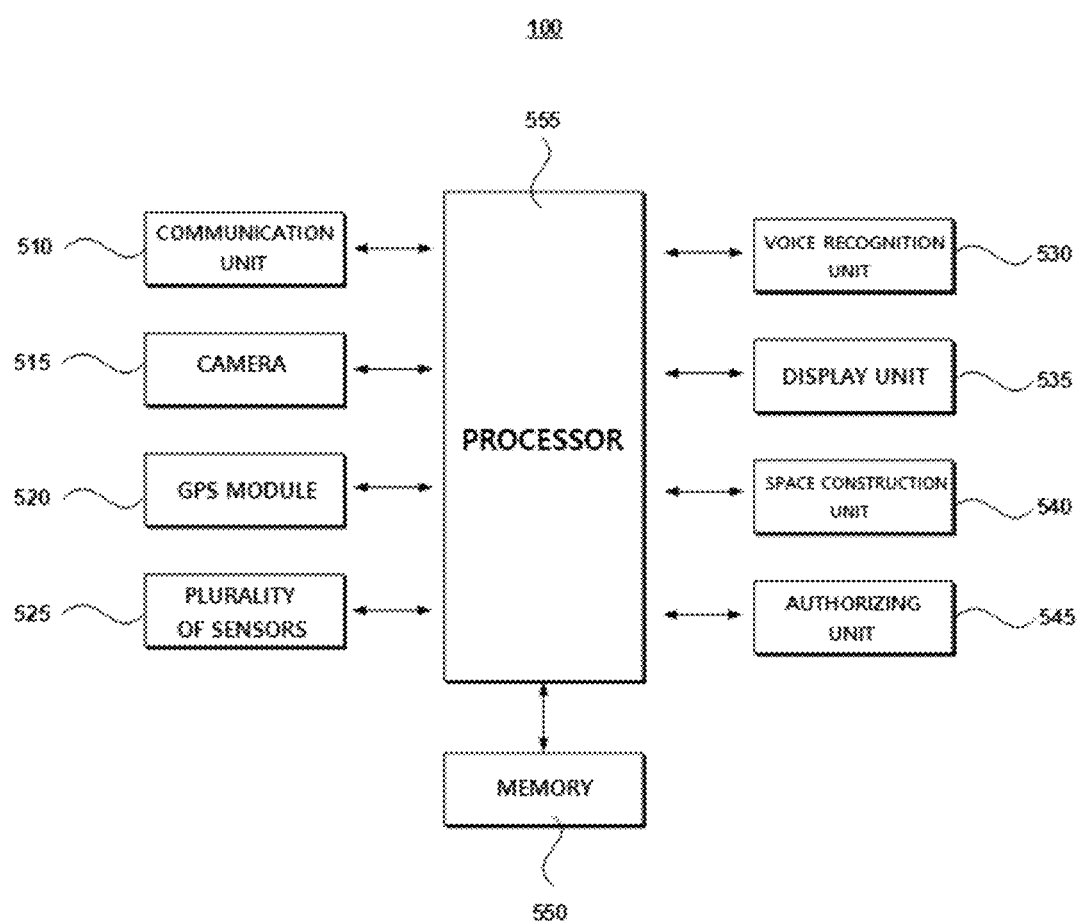
FIG. 5 is a block diagram schematically illustrating an internal configuration of an augmented reality content in-situ authoring apparatus according to an embodiment of the present disclosure.

FIG. 1 is a flowchart illustrating an augmented reality content in-situ authoring method according to an embodiment of the present disclosure, FIG. 2 is a diagram illustrating division of a virtual three-dimensional (3D) space according to an embodiment of the present disclosure, FIG. 3 is a diagram illustrating an example in which some virtual spaces are integrated according to an embodiment of the present disclosure, FIG. 4 is a diagram illustrating division of the integrated virtual space according to an embodiment of the present disclosure, and FIG. 5 is a block diagram schematically illustrating an internal configuration of an augmented reality content in-situ authoring apparatus according to an embodiment of the present disclosure.

In step 110, an augmented reality content in-situ authoring apparatus 100 selects a reference object or an augmented target object to be augmented from a camera preview image of a real world based on an author position. Here, the position of author is an actual position where an author is positioned, and the author position tracked as the author moves to the position where the augmented target object is to be augmented, and may be acquired based on the GPS information in the augmented reality content in-situ authoring apparatus 100.

The author position is the position of the augmented reality content in-situ authoring apparatus 100 worn or possessed by an author, and is different from the position where the actual augmented target object is augmented. The author position may be used as a reference position when augmented reality content is provided to other experienced persons later.

In the author position, the augmented reality content in-situ authoring apparatus 100 may acquire a preview image of the real world through a camera mounted in the augmented reality content in-situ authoring apparatus 100, and then output the preview image through the augmented reality content in-situ authoring apparatus 100.

In step 115, the augmented reality content in-situ authoring apparatus 100 recognizes a 2D plane region in the camera preview image centered on the selected reference object or augmented target object.

In step 120, the augmented reality content in-situ authoring apparatus 100 constructs a virtual 3D space based on the recognized 2D plane region.

This will be described in more detail below.

The constructed virtual 3D space may include a plurality of 3D cube areas. That is, in constructing the virtual 3D space to surround the recognized 2D plane region, the augmented reality content in-situ authoring apparatus 100 may construct a virtual 3D space having nine 3D cube areas including a recognized 2D plane region. Here, the center of the 3D virtual space may be set as the center of the 2D plane region. In addition, in an embodiment of the present disclosure, for convenience of understanding and explanation, it is assumed that the virtual 3D space is composed of a plurality of cube areas, but it goes without saying that the shape of the 3D space may be implemented in various shapes such as a polygon and a cylinder in addition to the cube shape. Also, the shape of the virtual 3D space may be constructed differently according to the shape of the reference object or the augmented target object.

In this case, the size of the virtual 3D space may be set differently in consideration of at least one of the type and size of the augmented target object. For example, it is assumed that the augmented target object is an identification (ID) card. In the virtual 3D space, an initial virtual 3D space may be configured according to the size of the ID card so that the ID card may be augmented at an arbitrary point in the real space recognized through the camera preview image. As another example, it is assumed that the augmented target object is a fire extinguisher. In this case, the size of the space where the fire extinguisher is to be augmented and the space where the ID card is to be augmented may be different from each other.

Therefore, the augmented reality content in-situ authoring apparatus 100 may be configured by differently setting the size of the virtual 3D space in consideration of at least one of the type and size of the augmented target object. In this case, the type of augmented target object may be an information type, a game type, a virtual experience type, or a visual effect type.

In addition, in constructing the virtual 3D space based on the 2D plane region, the augmented reality content in-situ authoring apparatus 100 may determine a center position of the virtual 3D space, which is a starting position, as a position determined by author's gaze tracking or a pointing position of a part of an author's body within a camera preview image.

The augmented reality content in-situ authoring apparatus 100 may position the starting position as the center of the 2D plane region and then construct the virtual 3D space to surround the corresponding 2D plane region.

In addition, when there are multiple cameras, the augmented reality content in-situ authoring apparatus 100 may derive a distance to the corresponding starting position within the camera preview image, and determine the size of the virtual 3D space by further considering the derived distance. Since a method of deriving a distance to a specific point in an image based on an image of a stereo camera is self-evident to those skilled in the art, a separate description thereof will be omitted.

In addition, in constructing the virtual 3D space, the augmented reality content in-situ authoring apparatus 100 may express the plurality of 3D cube areas as different types of visual information. In this case, the augmented reality content in-situ authoring apparatus 100 may express a plurality of 3D cube areas as different visual information by reflecting author's constraints. For example, it is assumed that the author constraints are color weakness. The augmented reality content in-situ authoring apparatus 100 may express the 3D cube area in different colors with colors other than the color weakness color.

When the author constraints are color blindness, the augmented reality content in-situ authoring apparatus 100 may apply and express different hatches to each of the plurality of 3D cube areas. Each 3D cube area may be expressed as different visual information in consideration of the author's constraints so that an author may easily distinguish each 3D cube area.

In step 125, the augmented reality content in-situ authoring apparatus 100 selects any one of the plurality of 3D cube areas constituting the virtual 3D space, and divides the selected 3D cube area.

That is, the augmented reality content in-situ authoring apparatus 100 may select any one of the 3D cube areas and then repeatedly perform a process of dividing the selected cube area into the plurality of sub-cube areas. In this case, the augmented reality content in-situ authoring apparatus 100 may repeatedly perform a process of dividing the 3D cube area until the size of the final 3D cube area reaches a target size. The 3D cube area may be divided into n×n sizes. Here, n may be a natural number. Of course, depending on the implementation method, the cube area may be divided into n×m, and n and m may be different natural numbers.

In addition, the augmented reality content in-situ authoring apparatus 100 may select any one of the divided 3D cube areas and then may integrate the selected cube area with other adjacent cube areas to divide the reconstructed 3D space into the plurality of 3D cube areas. In this way, there is an advantage in that the position and size of the augmented target object to be augmented may be finely adjusted by reconstructing the virtual 3D space through the integration of other adjacent cube areas and changing the size.

In the method of selecting any one of the divided 3D cube areas, when the cube areas are sequentially activated at predetermined time intervals in order, and when the author inputs a selection command by way of voice, touch, etc., a cube area activated at the time when the corresponding selection command is input may be selected.

For another example, one of the 3D cube areas may be selected through a command (e.g., number, color, etc.) for selecting visual information allocated to any one of the divided 3D cube areas. Of course, the augmented reality content in-situ authoring apparatus 100 may select any one of the divided 3D cube areas based on gesture recognition.

As another example, the augmented reality content in-situ authoring apparatus 100 may adjust the size of the corresponding 3D cube area according to a size adjustment trigger command of any one of the divided 3D cube areas.

In this case, the size adjustment trigger command may be a voice command or a text command.

As another example, as illustrated in FIG. 3, the augmented reality content in-situ authoring apparatus 100 may integrate at least some of the plurality of sub cube areas and then reconstruct a sub-virtual space. As illustrated in FIG. 4, the reconstructed sub-virtual space may include a plurality of sub-cube areas.

In this way, the augmented reality content in-situ authoring apparatus 100 may construct a virtual 3D space including a plurality of cube areas, and then finely adjust the position where the augmented target object is to be augmented through a reconstruction/division process or the like of dividing the constructed virtual 3D space or integrating a part of the constructed virtual 3D space.

In step 130, the augmented reality content in-situ authoring apparatus 100 may select any one of the plurality of sub-cube areas as an augmented target space, and augment an augmented target object centered on the selected augmented target space and then rotate the augmented target object to determine an augmented direction.

The augmented reality content in-situ authoring apparatus 100 may construct a virtual 3D space based on a recognized 2D plane region centered on a reference object or augmented target object, and then determine an augmented position where an augmented target object is to be augmented by a process of reconstructing a 3D space through at least one of the division and integration of the constructed virtual 3D space.

In this way, when the augmented position is determined, the augmented reality content in-situ authoring apparatus 100 may augment the augmented target object in the augmented position and then rotate the augmented target object to determine the augmented direction. In step 135, the augmented reality content in-situ authoring apparatus 100 registers augmented reality content and augmented-related meta information on the corresponding augmented reality content in a database. Here, the augmented-related meta information may include the augmented direction for the augmented reality content. Also, the augment-related meta information may further include an author position and an augmented position. The author position may be GPS information of the augmented reality content in-situ authoring apparatus 100, and the augmented position may include at least one of distance information to the reference object or the augmented target object obtained from the camera preview image and pixel coordinate information on the augmented target space.

FIG. 5 is a block diagram schematically illustrating an internal configuration of an augmented reality content in-situ authoring apparatus according to an embodiment of the present disclosure. The augmented reality content in-situ authoring apparatus 100 may be an Head-Mounted Display (HMD) device or a smartphone.

Referring to FIG. 5, the augmented reality content in-situ authoring apparatus 100 according to the embodiment of the present disclosure includes a communication unit 510, a camera 515, a GPS module 520, a plurality of sensors 525, a voice recognition unit 530, a display unit 535, a space construction unit 540, an authoring unit 545, a memory 550, and a processor 555.

The communication unit 510 is a means for transmitting and receiving data with other devices (e.g., a server (not illustrated)) through a communication network.

The camera 515 is a means for acquiring images of a real world.

The GPS module 520 is a means for acquiring GPS information.

The plurality of sensors 525 are mounted on the augmented reality content in-situ authoring apparatus 100 and are means for detecting orientation information. That is, the plurality of sensors 525 may detect the orientation information according to a viewpoint of an author wearing the augmented reality content in-situ authoring apparatus 100. In addition, the plurality of sensors 525 may recognize an author's gesture.

The voice recognition unit 530 is a means for receiving a voice command. For example, the voice recognition unit 530 may be a microphone.

The display unit 535 is a means for displaying the image of the real world acquired through the camera 515 under the control of the processor 555, the augmented reality content, the virtual 3D space (cube area), or the like in the form of visual information.

The space construction unit 540 is a means for recognizing the 2D plane region centered on the reference object or the augmented target object to be augmented selected from the camera preview image of the real world, and constructing the virtual 3D space centered on the recognized 2D plane region. Here, the virtual 3D space may include a plurality of 3D cube areas surrounding the recognized 2D plane region.

In addition, the space construction unit 540 may select and divide any one of the plurality of 3D cube areas to reconstruct a sub-virtual space. Here, the space construction unit 540 may perform the process of dividing the virtual 3D space plural times to determine the augmented target space. In this case, as described above, the space construction unit 540 may integrate some of the cube area to repetitively perform the process of reconstructing the sub-virtual space, and then, dividing the sub-virtual space.

The authoring unit 545 may augment the augmented target object centered on the finally determined augmented target space in the space construction unit 540, rotate the augmented target object, determine the augmented direction, and register the augmented reality content in the database.

Also, when a position adjustment trigger command is input from the voice recognition unit 530, the authoring unit 545 may also adjust the position of the augmented target space according to the corresponding position adjustment trigger command.

In an embodiment of the present disclosure, it is assumed that the position adjustment trigger command is input through the voice recognition unit 530, and the description is centered on the position adjustment trigger command, but it is natural that the position adjustment trigger command may be received through other means, for example, a touch, gesture, etc.

In addition, as described above, the augmented reality content may be registered in the database, including the augment-related metadata. The augment-related metadata may further include an author position and an augmented position. Since this is the same as the above description, redundant description thereof will be omitted.

The memory 550 is a means for storing program codes for performing the augmented reality content in-situ authoring method according to an embodiment of the present disclosure.

The processor 555 is a means for controlling the internal components (e.g., the communication unit 510, the camera 515, the GPS module 520, the plurality of sensors 525, the voice recognition unit 530, the display unit 535, the space construction unit 540, the authoring unit 545, the memory 550, etc.).

In addition, the processor 555 may recognize a part of the author's body through the camera 515 to determine the authoring position, or recognize the author's gesture detected through the plurality of sensors 525 to control the spatial division/integration into at least one of the space construction unit 540 and the authoring unit 545 or control the position adjustment, the rotation, and the like of augmented reality content, etc., by the authoring-related trigger command.

The apparatus and the method according to the embodiment of the present disclosure may be implemented in a form of program commands that may be executed through various computer means and may be recorded in a computer-readable recording medium. The computer-readable recording medium may include a program command, a data file, a data structure, or the like, alone or a combination thereof. The program commands recorded in the computer-readable recording medium may be especially designed and constituted for the present disclosure or be known to those skilled in a field of computer software. Examples of the computer-readable recording medium may include magnetic media such as a hard disk, a floppy disk, and a magnetic tape, optical media such as a compact disk read only memory (CD-ROM) or a digital versatile disk (DVD), magneto-optical media such as a floptical disk, and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler.

The above-mentioned hardware device may be constituted to be operated as one or more software modules in order to perform an operation according to the present disclosure, and vice versa.

By providing an augmented reality content in-situ authoring method and apparatus according to an embodiment of the present disclosure, it is possible to finely adjust an augmented object position through repetitive division of a 3D space in the field where augmented reality content is actually used.

Hereinabove, the present disclosure has been described with reference to embodiments thereof. It will be understood by those skilled in the art to which the present disclosure pertains that the present disclosure may be implemented in a modified form without departing from essential characteristics of the present disclosure. Therefore, the embodiments disclosed herein should be considered in an illustrative aspect rather than a restrictive aspect. The scope of the present disclosure should be defined by the claims rather than the above-mentioned description, and equivalents to the claims should be interpreted to fall within the present disclosure.

What is claimed is:

1. An augmented reality content in-situ authoring method, comprising:
    selecting an augmented target object to be augmented from a camera preview image of a real world;
    recognizing a two-dimensional (2D) plane region based on the augmented target object and then constructing a virtual three-dimensional (3D) space centered on the 2D plane region, wherein the virtual 3D space includes a plurality of 3D cube areas surrounding the recognized 2D plane region;

reconstructing a virtual sub-space including a plurality of sub-cube areas by dividing at least one of the plurality of 3D cube areas;

selecting any one of the plurality of sub-cube areas as an augmented target space, augmenting the augmented target object centered on the augmented target space, rotating the augmented target object to determine an augmented direction, and then registering augmented reality content in a database; and receiving a selection of an authoring position in the camera preview image through author's gaze tracking and a point using a part of an author's body in the camera preview image, wherein a size of the virtual 3D space is constructed differently according to at least one of a type and size of the augmented target object, wherein at least one of a size of the virtual 3D space and a central position of the virtual 3D space is constructed differently based on the selected authoring position, wherein each of the plurality of 3D cube areas is visually expressed as different visual information based on an author's constraint, which includes at least one of color vision deficiency or color blindness, and wherein the plurality of 3D cube areas being expressed in different colors excluding color-deficient colors or in different hatching styles.

2. The augmented reality content in-situ authoring method of claim 1, wherein the augmented reality content further includes augment-related meta information, and the augment-related meta information includes an augmented position corresponding to the augmented target space and the augmented direction.

3. The augmented reality content in-situ authoring method of claim 1, wherein the dividing at least one of the plurality of 3D cube areas is repetitively performed until a size of the augmented target space reaches a target size.

4. The augmented reality content in-situ authoring method of claim 1, further comprising:

when another 3D cube area, adjacent to the at least one of the plurality of 3D cube areas selected to be divided, is additionally selected, reconstructing a virtual sub-space by integrating the at least one of the plurality of 3D cube areas selected to be divided and the additionally selected 3D cube area.

5. The augmented reality content in-situ authoring method of claim 1, further comprising:

adjusting the size or position of the at least one of the plurality of 3D cube areas selected to be divided according to a size or position adjustment trigger command.

6. A non-transitory computer-readable recording medium storing instructions that, when executed by one or more processors, cause the processors to perform selecting an augmented target object to be augmented from a camera preview image of a real world;

recognizing a two-dimensional (2D) plane region based on the augmented target object and then constructing a virtual three-dimensional (3D) space centered on the 2D plane region, wherein the virtual 3D space includes a plurality of 3D cube areas surrounding the recognized 2D plane region;

reconstructing a virtual sub-space including a plurality of sub-cube areas by dividing at least one of the plurality of 3D cube areas;

selecting any one of the plurality of sub-cube areas as an augmented target space, augmenting the augmented target object centered on the augmented target space, rotating the augmented target object to determine an augmented direction, and then registering augmented reality content in a database; and receiving a selection of an authoring position in the camera preview image through author's gaze tracking and a point using a part of an author's body in the camera preview image, wherein a size of the virtual 3D space is constructed differently according to at least one of a type and size of the augmented target object, wherein at least one of a size of the virtual 3D space and a central position of the virtual 3D space is constructed differently based on the selected authoring position, wherein each of the plurality of 3D cube areas is visually expressed as different visual information based on an author's constraint, which includes at least one of color vision deficiency or color blindness, and wherein the plurality of 3D cube areas being expressed in different colors excluding color-deficient colors or in different hatching styles.

7. An augmented reality content in-situ authoring apparatus, comprising:

a camera:

a memory including at least one instruction; and a processor executing instructions stored in the memory, wherein each of the instructions executed by the processor performs:

selecting an augmented target object to be augmented from a camera preview image of a real world;

recognizing a two-dimensional (2D) plane region based on the augmented target object and then constructing a virtual three-dimensional (3D) space centered on the 2D plane region, wherein the virtual 3D space includes a plurality of 3D cube areas surrounding the recognized 2D plane region;

reconstructing a virtual sub-space including a plurality of sub-cube areas by dividing at least one of the plurality of 3D cube areas;

selecting any one of the plurality of sub-cube areas as an augmented target space, augmenting the augmented target object centered on the augmented target space, rotating the augmented target object to determine an augmented direction, and then registering augmented reality content in a database; and receiving a selection of an authoring position in the camera preview image through author's gaze tracking and a point using a part of an author's body in the camera preview image, wherein a size of the virtual 3D space is constructed differently according to at least one of a type and size of the augmented target object, wherein at least one of a size of the virtual 3D space and a central position of the virtual 3D space is constructed differently based on the selected authoring position, wherein each of the plurality of 3D cube areas is visually expressed as different visual information based on an author's constraint, which includes at least one of color vision deficiency or color blindness, and wherein the plurality of 3D cube areas being expressed in different colors excluding color-deficient colors or in different hatching styles.

8. The augmented reality content in-situ authoring apparatus of claim 7, wherein the dividing at least one of the plurality of 3D cube areas is repetitively performed until the size of the augmented target space reaches a target size.

* * * * *